US009374569B2

(12) United States Patent
Sarkar (10) Patent No.: US 9,374,569 B2
(45) Date of Patent: Jun. 21, 2016

(54) STORAGE MEDIA PRE-PROGRAMMED FOR ENHANCED SEARCH AND RETRIEVAL OF MULTIMEDIA CONTENT

(76) Inventor: Subhanjan Sarkar, Bangalore (IN)

( * ) Notice: Subject to any disclaimer, the term of this patent is extended or adjusted under 35 U.S.C. 154(b) by 0 days.

(21) Appl. No.: 13/978,500

(22) PCT Filed: Jan. 6, 2012

(86) PCT No.: PCT/IN2012/000020
§ 371 (c)(1),
(2), (4) Date: Jul. 5, 2013

(87) PCT Pub. No.: WO2012/093409
PCT Pub. Date: Jul. 12, 2012

(65) Prior Publication Data
US 2013/0294748 A1 Nov. 7, 2013

(30) Foreign Application Priority Data

Jan. 7, 2011 (IN) .............................. 49/CHE/2011

(51) Int. Cl.
*H04N 9/87* (2006.01)
*G11B 27/34* (2006.01)
(52) U.S. Cl.
CPC . *H04N 9/87* (2013.01); *G11B 27/34* (2013.01)
(58) Field of Classification Search
None
See application file for complete search history.

(56) References Cited

U.S. PATENT DOCUMENTS

| 2003/0106068 | A1* | 6/2003 | Ishida et al. ................... 725/134 |
| 2004/0203639 | A1* | 10/2004 | Ozer ................... H04N 5/44543 455/414.1 |
| 2005/0028194 | A1* | 2/2005 | Elenbaas et al. ................. 725/32 |
| 2006/0195867 | A1* | 8/2006 | Takehara et al. ................. 725/46 |
| 2007/0130177 | A1* | 6/2007 | Schneider ......... G06F 17/30017 |
| 2007/0253678 | A1* | 11/2007 | Sarukkai ........................ 386/95 |

* cited by examiner

*Primary Examiner* — Hung Dang
*Assistant Examiner* — Sunghyoun Park
(74) *Attorney, Agent, or Firm* — The Law Office of Austin Bonderer, PC; Austin Bonderer (57) ABSTRACT

A non-transitory storage medium readable by a non-versatile interpretation device (e.g., navigation engine of DVD player) and executable on a player device (e.g., a DVD player), the non-transitory storage medium comprising instructions executable even on the non-versatile interpretation device to enable a method of enhanced search and retrieval of one or more relevant media entities (e.g., a combination of an audio stream and a video stream corresponding to a video) from a comprehensive dataset of media entities stored on the non-transitory storage medium. The non-versatile interpretation device comprises a navigation engine built on a limited set of virtual commands embedded on to a chipset to provide interaction with the media entities. The non-transitory storage medium stores a plurality of keywords that are in-built. Each of the keywords are pre-linked to at least one of the media entities on the non-transitory storage medium.

8 Claims, 13 Drawing Sheets

FIG. 1 (PRIOR ART)

| Command | Type | Description | # |
|---|---|---|---|
| GoTo | 1 | Change the execution order of the navigation commands. | 1 |
| Link | 1 | Start the specified presentation within the domain (includes setting of the highlight button). | 1 |
| Jump | 1 | Start the specified presentation within another domain. | 1 |
| Compare GoTo | 1 | If the result of the compare is true, then GoTo. | 2 |
| Compare Link | 1 | If the result of the compare is true, then Link. | 2 |
| Compare Jump | 1 | If the result of the compare is true, then Jump. | 2 |
| SetSystem | 2 | Set navigation parameters (SPRMs and GPRMs). | 1 |
| Set GPRM | 2 | Compute GPRM value. | 1 |
| Compare SetSystem | 2 | If the result of the compare is true, then SetSystem. | 2 |
| Compare Set | 2 | If the result of the compare is true, then Set. | 2 |
| SetSystem Link | 2 | SetSystem and then Link. | 2 |
| Set Link | 2 | Set and then Link. | 2 |
| Set Compare Link by SubInstructions | 3 | Set and if the result of the compare is true, then Link by SubInstructions. | 3 |
| Compare & Set - SubInstructions | 3 | If the result of the compare is true, then Set and Link by SubInstructions. | 3 |
| Compare-Set & SubInstructions | 3 | If the result of the compare is true, then Set, and (ignoring compare) Link by SubInstructions. | 3 |

FIG. 2 (PRIOR ART)

| VM Command | Description |
|---|---|
| 1. Nop | No Operation. |
| 2. GoTo | Go to a specified command line. |
| 3. Break | Exit the current command section. |
| 4. Exit | Terminate the playback of a video DVD. |
| 5. LinkPGCN | Link to a PGC in the same domain. |
| 6. LinkPGN | Link to a program in the same PGC. |
| 7. LinkCN | Link to a cell in the same PGC. |
| 8. Rsm | Resume playback. |
| 9. JumpVTS_TT | Jump to a video title in the same VTS. |
| 10. JumpVTS_PTT | Jump to a PTT in a specified VTS. |
| 11. JumpSS | Jump to a PGC in System Space. |
| 12. SetSTN | Set Stream Number. |
| 13. SetGPRM | Define contents of a GPRM register. |
| 14. SetGPRMMD | Set GPRM register/counter mode. |
| 15. SetHL_BTN | Set Highlight Menu Button. |
| 16. SetGPRM, Compare & Link | Compute GPRM, compare to another GPRM and Link |
| 17. Compare, SetGPRM & Link | Compare GPRM, compute another GPRM and Link |
| 18. Compare, SetGPRM, Link | Compare GPRM, compute another GPRM, Link |

STORAGE MEDIA PRE-PROGRAMMED FOR ENHANCED SEARCH AND RETRIEVAL OF MULTIMEDIA CONTENT

BACKGROUND

1. Technical Field

The embodiments herein generally relate to an interface for a storage media, and, more particularly, to a storage medium with an in-built menu based interactivity and navigation that includes retrieval of relevant multimedia content based on keywords pre-linked with multimedia content.

2. Description of the Related Art

DVDs have traditionally been built upon the idea of delivering the movie hall film to the viewer's home TV set. The entire purpose and logic behind the structure of a DVD was motivated by and guided by this concern primarily. In that sense, the traditional DVD with its simple menu with an option to choose a language, a subtitle language, and sound scheme (e.g., stereo or 5.1 surround sound) was sufficient and provided excellent support for the film industry In the meantime, the world has changed rapidly with the internet, Rich internet applications, cheap and powerful computers and myriad multimedia formats and possibilities. The ubiquitous DVD has however been restricted to its original standard specification. So while DVDs today can, and do provide different types of content, its interactive possibilities have not yet been utilized in the manner in which a multimedia application or the internet has been.

DVD-Video contents are organized as contiguous addressable chunks of data, known as program streams. In order to play back the contents recorded on a DVD disc, the DVD player firmware includes two major components, namely a presentation engine and a navigation engine. The presentation engine uses information in the presentation data stream from the disc to know how to display its contents. For navigation, the DVD player uses the information in the navigation data stream from the disc to provide interactivity for the user interface, display menus, etc. via a standard set of player instructions.

Figure 1:
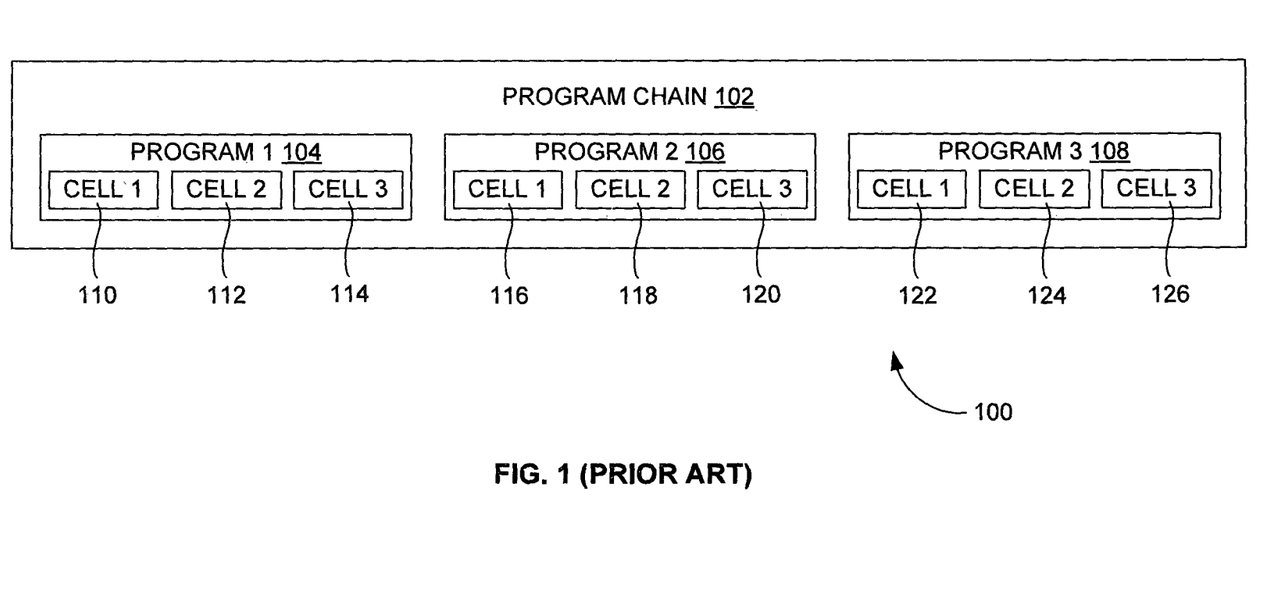
FIG. 1 illustrates a user interface view of the program chain within a typical DVD.

The structure of any typical DVD structure comprises of: a) Cell b) Program c) Chapter d) Program chain (PGC) e) VOB f) Video title set. FIG. 1 illustrates a user interface view 100 of the program chain within a typical DVD. The program chain 102 includes a plurality of programs such as a program 104, a program 106 and a program 108. The programs include a plurality of cells.

The program 104 includes a cell 1 110, a cell 2 112 and a cell 3 114. The program 106 includes a cell 1 116, a cell 2 118 and a cell 3 120. The program 108 includes a cell 1 122, a cell 2 124 and a cell 3 126. The program chain usually consists of information and commands on how to play back a list of cells.

Figure 2:
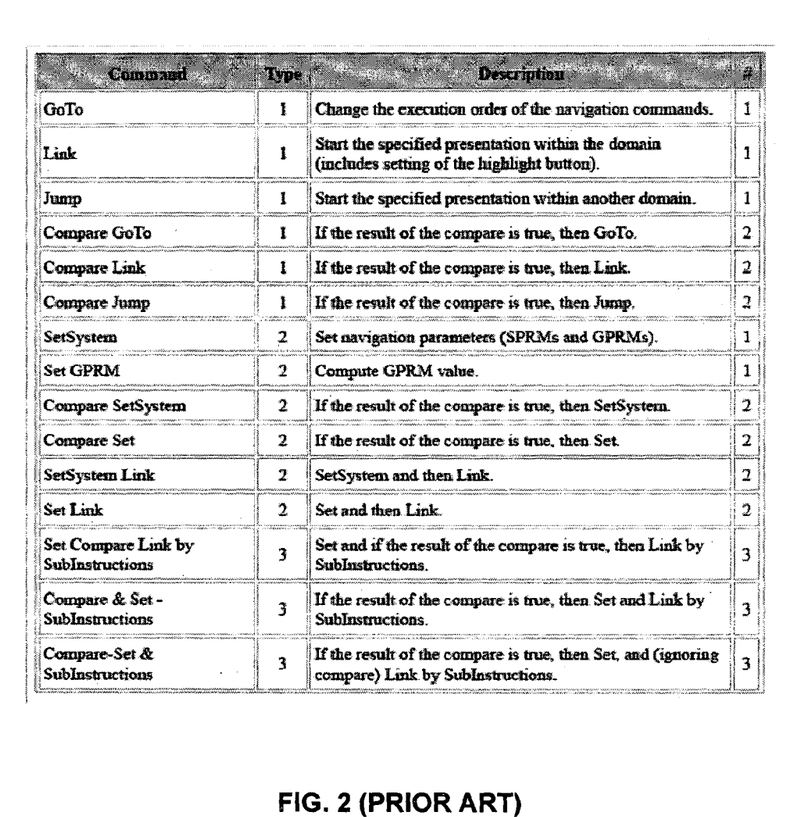
FIG. 2 illustrates a table view of limited virtual commands in a typical DVD.
Figure 3:
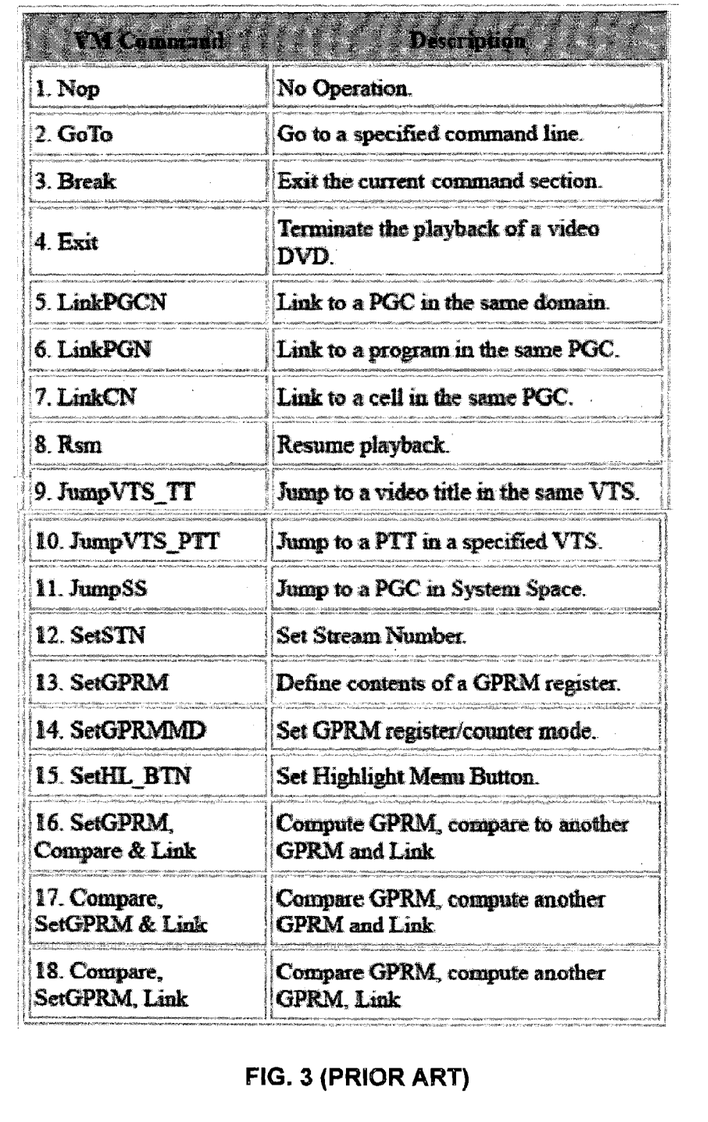
FIG. 3 illustrates a table view of virtual commands that are available in a Video Title Set Menu (VTSM) domain.

Storage media like DVDs inherently lack interactive functionality which is provided to them by playing them in computers. The storage media like DVD when played on DVD players provides limited interactivity with the multimedia content fed in them. Certain DVDs enable user to restrict selected multimedia contents from access by other users, some DVDs allow user to select pre-defined multimedia content to be played. No DVD currently provides a full fledged navigation menu based interactive functionality when played on a DVD player. The navigation data stream of the DVD provides interactivity for the user interface, display menus, and to support random access and conditional branching, etc, via a standard set of player instructions known as DVD virtual commands. However, these DVD virtual commands are limited to certain basic functionalities. FIG. 2 illustrates a table view of limited virtual commands in a typical DVD. FIG. 3 illustrates a table view of virtual commands that are available in a Video Title Set Menu (VTSM) domain.

Further, when a DVD stores a large amount of multimedia content, retrieval of relevant content is a huge challenge, since the DVD does not support search functionalities or advanced navigation functionalities. For example, in the case of a DVD that stores hundreds or thousands of videos, one has to manually select and play each video to find the video that is of relevance if one is unaware of its contents. Therefore there remains a need for developing interface for a storage media enhancing interactivity of a user with information retrieval of the multimedia content especially when the storage media like DVD is played on a DVD player.

SUMMARY

In view of the foregoing, an embodiment herein provides a non-transitory storage medium readable by a non-versatile interpretation device and executable on a player device. The non-transitory storage medium includes instructions executable even on the non-versatile interpretation device to enable a method of enhanced search and retrieval of one or more relevant media entities from a comprehensive dataset of media entities stored on the non-transitory storage medium. The non-versatile interpretation device includes a navigation engine built on a limited set of virtual commands embedded on to a chipset to provide interaction with the media entities. The non-transitory storage medium stores a plurality of keywords that are in-built. Each of the keywords are pre-linked to at least one of the media entities on the non-transitory storage medium. The player device includes a processor, a selection means, and a display. The method includes displaying, by the display means, the plurality of keywords already stored on the non-transitory storage medium, processing, by the selection means, a first input includes a mere selection of a keyword from the plurality of keywords, displaying, by the display means, a subset of the comprehensive dataset of media entities, the subset consists of specific media entities pre-linked to the keyword on the non-transitory storage medium, processing, by the selection means, a second input that includes a selection of a media entity, and playing the media entity.

The plurality of keywords already stored on the non-transitory storage medium is displayed in response to a selection of a keywords interactive entity from a first level menu that includes the keywords menu interactive entity, a graded submenu interactive entity, a favourites menu interactive entity, and/or a key media entities menu interactive entity. A first level submenu interactive entity and a second level submenu interactive entity are displayed in response to a selection of the graded submenu interactive entity.

A first subset of said comprehensive dataset of media entities is linked to the first level submenu, and a second subset of said comprehensive dataset of media entities is linked to a second level submenu. The method of enhanced search and retrieval of one or more relevant media entities from said comprehensive dataset of media entities stored on said non-transitory storage medium further includes processing, by the selection means, a third input that includes a selection of the first level submenu, and displaying the first subset of the comprehensive dataset of media entities linked to the first level submenu in response to the selection of said first level submenu. The keywords interactive entity is also displayed on the same screen along with the first level submenu and the second level submenu.

The method of enhanced search and retrieval of one or more relevant media entities from said comprehensive dataset of media entities stored on said non-transitory storage medium further includes processing, by the selection means, a fourth input comprising a selection of the second level submenu, and displaying the second subset of said comprehensive dataset of media entities linked to the second level submenu in response to the selection of the second level submenu. The keywords interactive entity is may also be again displayed on the same screen along with the first level submenu and the second level submenu.

The media entities are displayed along with a unique identification reference. The method of enhanced search and retrieval of one or more relevant media entities from said comprehensive dataset of media entities stored on said non-transitory storage medium further includes recording a unique identification reference of a relevant media entity, processing, by the selection means, a fifth input that includes a selection of the favourites interactive entity, displaying, by the display means, a set of interactive entities along with their corresponding unique identification references, and playing, the relevant media entity in response to a selection of an interactive entity corresponding to the unique identification reference by a user. The set of interactive entities correspond to the comprehensive dataset of media entities.

The method of enhanced search and retrieval of one or more relevant media entities from said comprehensive dataset of media entities stored on said non-transitory storage medium further includes processing, by the selection means, a fifth input that includes a selection of at least one selected menu from the keywords menu interactive entity, the graded submenu interactive entity, a favourites menu interactive entity, or a key media entities menu interactive entity, playing a set of media entities that correspond to the selected menu in response to a selection of a play all interactive entity, and automatically displaying, by the display means, the selected menu once the set of media entities corresponding to the selected menu is played.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for making an interface for enhancing interaction with multimedia content on a storage media through a TV/DVD player remote control. The embodiments herein achieve this by providing an interface for enhancing interaction with multimedia content on a storage device. Referring now to the drawings, and more particularly to FIG. 4 through FIG. 13, where similar reference characters denote corresponding features consistently throughout the figures, there are shown preferred embodiments.

The non-transitory storage medium may be an optical disc such as a DVD (Digital Versatile Disc or Digital Video Disc), Blu-ray disc etc. In one embodiment, the non-transitory storage medium may be an EPROM of a set-top box. The non-versatile interpretation device may be a DVD player with limited navigation functionalities. The non-versatile interpretation device is not a general purpose computer or PC, it is not a game console (e.g., Xbox, Play Station), a smart device (e.g., smart phone or smart tablet) or any computing device that can support advanced navigation. The media entities may each correspond to a single video with an audio stream file, a video stream file etc.

Figure 4:
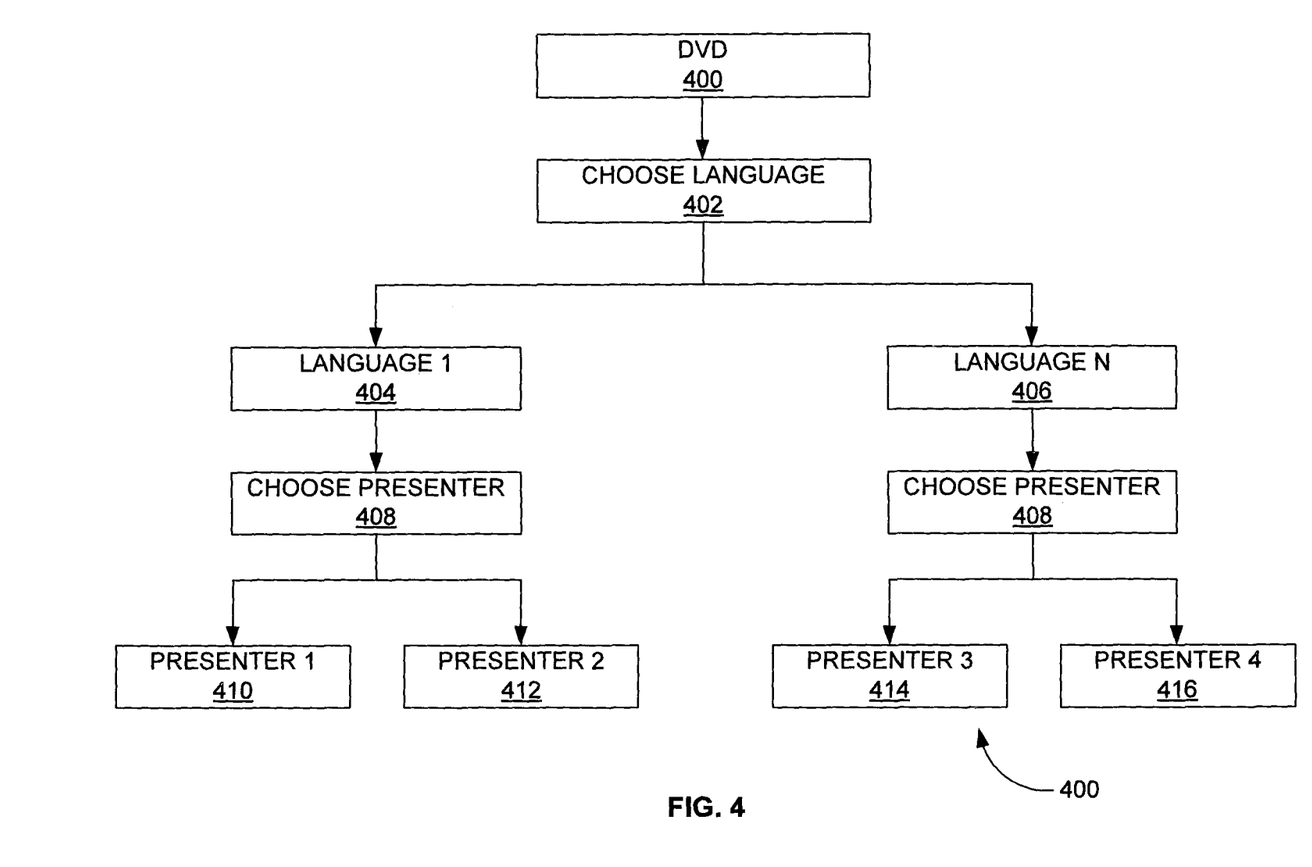
FIG. 4 illustrates an introductory menu for enhanced interaction with multimedia content on a storage media according to an embodiment herein.

FIG. 4 illustrates an introductory menu 400 for enhanced interaction with multimedia content on a storage device according to an embodiment herein. The introductory menu 400 includes a language selection button 402, a first language button 404, a second language button 406, a presenter selection button 408, a first presenter button 410, a second presenter button 412, a third presenter button 414 and a fourth presenter button 416. The language selection button 402 allows a user to visualise language options provided for interaction with multimedia content on a storage media. On clicking or pressing any of the first language button 404 and the second language button 406, a user may choose a corresponding language. The presenter selection button 408 allows a user to visualise presenter options provided for interaction with multimedia content on a storage media.

The presenters provided under the presenter selection button 408 are provided on the basis of language chosen from language selection button. In an embodiment, on choosing the first language 404 the presenter provided on clicking or pressing the presenter selection button 408 are the first presenter 410 and the second presenter 412. In another embodiment, when the second language 406 is chosen the presenters provided are the third presenter 414 and the fourth presenter 416.

On clicking or pressing any of the first presenter button 410 and the second presenter button 412 a user may choose a corresponding presenter. In an embodiment, the storage media may be a DVD. In another embodiment, there may be more than two languages to select for a user. In another embodiment, there may be more than two presenters to select for a user. The presenter may be language specific i.e. a particular presenter may only be chosen on selecting a particular language.

Figure 5:
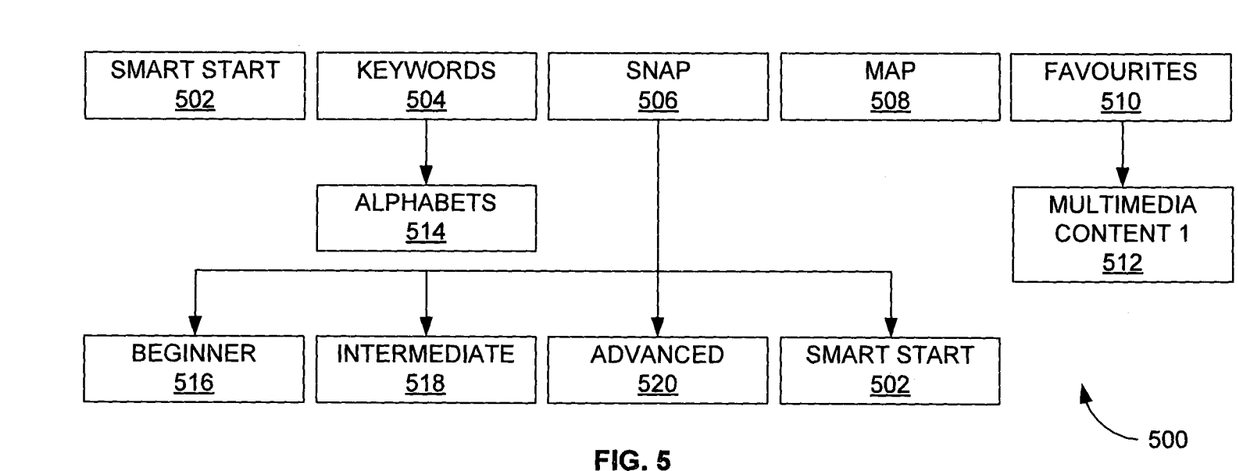
FIG. 5 illustrates a main menu for enhanced interaction with multimedia content on storage media according to an embodiment herein.

FIG. 5 illustrates a main menu 500 for enhanced interaction with multimedia content on a storage device according to an embodiment herein. The main menu 500 includes a smartstart button 502, a keyword button 504, a snap button 506, a map button 508 and a favourites button 510. On choosing a presenter in the introductory menu 400 of FIG. 1, the main menu 500 is displayed in the language chosen from the introductory menu 400 of FIG. 1. The smartstart 502 button includes a plurality of multimedia content 512 that provides more than basic knowledge on using a product and getting a minimum value out of the product usage. The keyword button 504 includes a plurality of alphabet pages 514 that provide keyword based interaction with a desired multimedia content on a storage media. The snap button 506 includes a beginner button 516, an intermediate button 518, an advanced button 520 and the smartstart button 502. On pressing or clicking the beginner button 516 the multimedia that provides a very basic training on using a product is listed. On pressing or clicking the intermediate button 518 the multimedia content for training an intermediate user is listed. On pressing the advanced button 520 the multimedia content for an advanced user is listed. Another access to multimedia content listed under smartstart is provided through the snap button 506. The map button 508 provides a topological view of the multimedia content stored in a storage media. The favourites button 510 lists all the multimedia content in a mathematical number sequence for easy access to a desired multimedia content.

Figure 6:
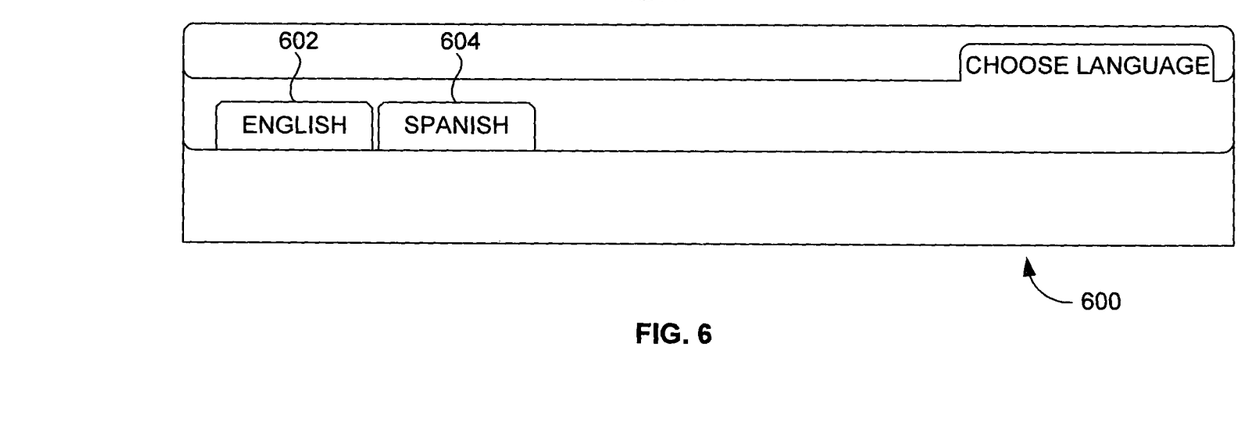
FIG. 6 illustrates a user interface view of language selection interface for enhanced interaction with multimedia content on a storage media according to an embodiment herein.

FIG. 6 illustrates a user interface view 600 of a language selection interface for enhanced interaction with multimedia content on a storage media according to an embodiment herein. The user interface view 600 includes a first language selection button 602 and a second language selection button 604. The further interaction with the multimedia content on a storage media is in the language chosen.

Figure 7A:
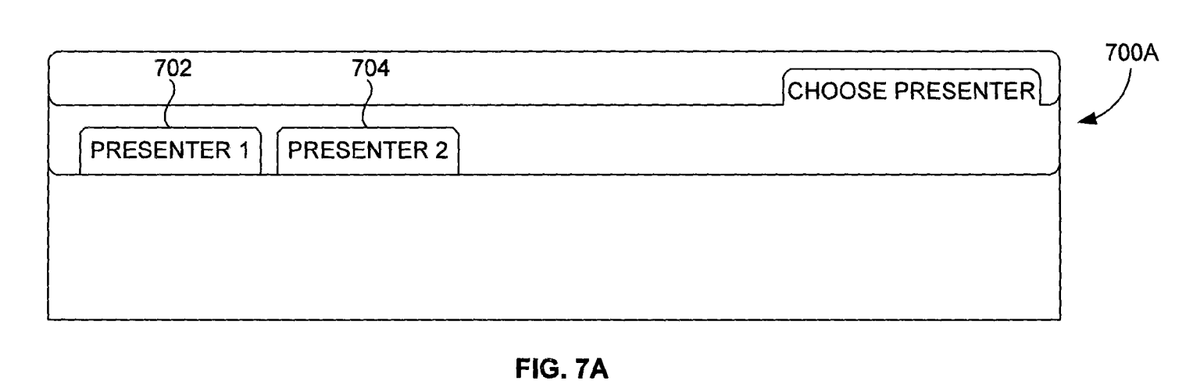
FIG. 7A illustrates a user interface view of presenter selection interface for a selected first language for enhanced interaction with multimedia content on a storage media according to an embodiment herein.

FIG. 7A illustrates a user interface view 700A of a presenter selection interface for enhanced interaction with multimedia content on a storage media according to an embodiment herein. The presenters displayed in the presenter selection interface are based upon the language selected. The user interface view 700A includes a first presenter 702 and a second presenter 704 corresponding to the first language 702. The user is allowed to select any of the two presenters.

Figure 7B:
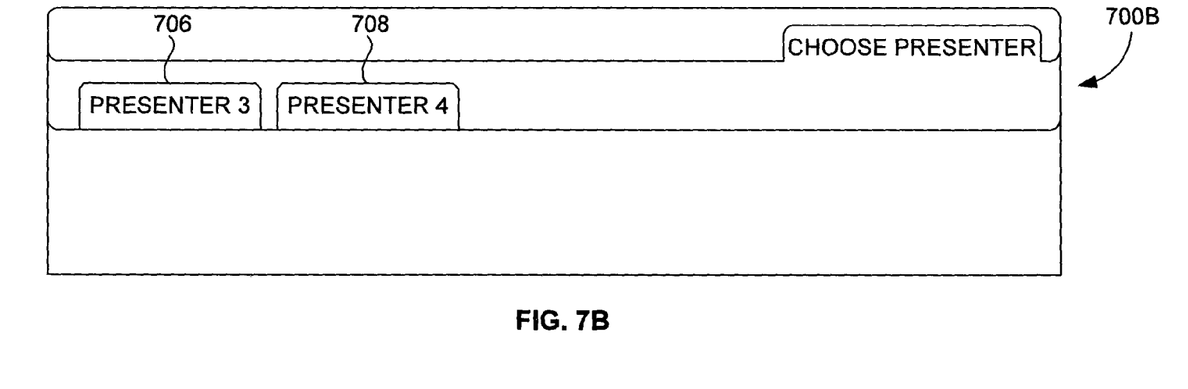
FIG. 7B illustrates a user interface view of presenter selection interface for a selected second language for enhanced interaction with multimedia content on a storage media according to an embodiment herein.

FIG. 7B illustrates a user interface view 700B of a presenter selection interface for enhanced interaction with multimedia content on a storage media according to an embodiment herein. The presenters displayed in the presenter selection interface are based upon the language selected. The user interface view 700B includes a first presenter 706 and a second presenter 708 corresponding to the second language. The user is allowed to select any of the two presenters.

Figure 8:
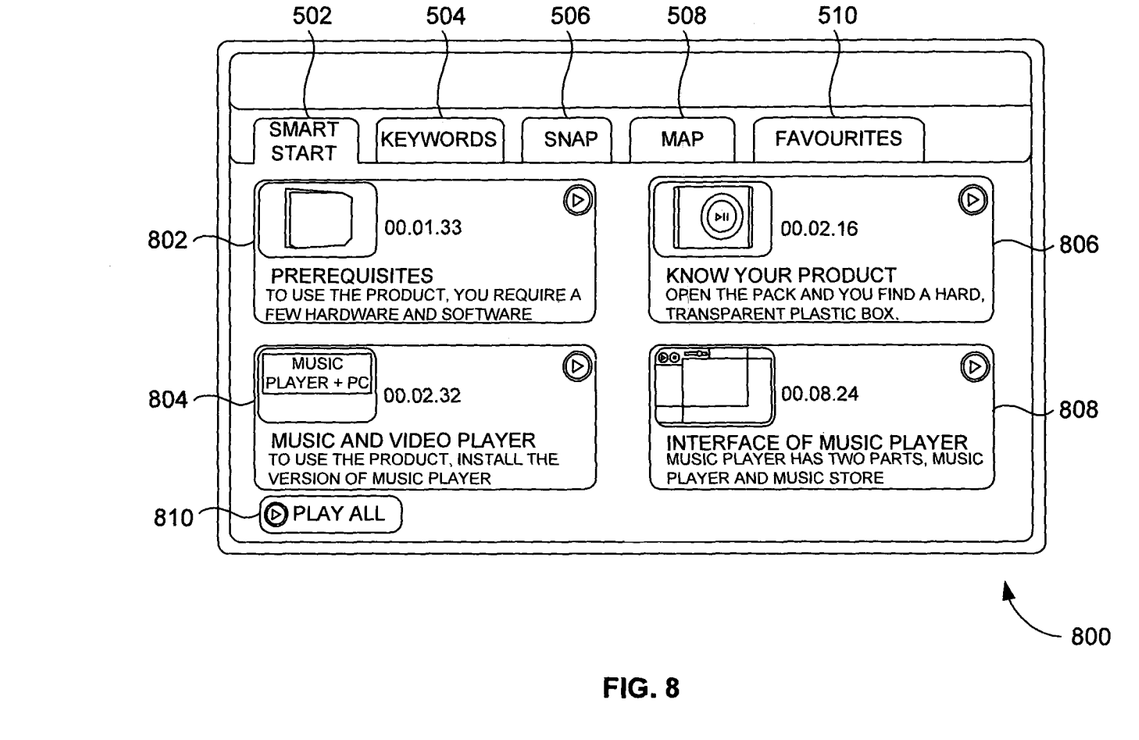
FIG. 8 illustrates a user interface view of a smartstart interface of for enhanced interaction with multimedia content on a storage media according to an embodiment herein.

FIG. 8 illustrates a user interface view 800 of a smartstart interface for enhanced interaction with multimedia content on storage media according to an embodiment herein. The user interface view 800 is in one of the selected languages. The user interface view 800 includes the smartstart button 502, the keyword button 504, the snap button 506, the map button 508, the favourites button 510, a play all button 810 and thumbnail previews of demo films 802-808. The demo films 802-808 provide overview of using a product.

In one embodiment, the user can play the film 802 by selecting the play icon. Similarly, film 804, 806 and 808 can also be played by selecting the corresponding play icon. In another embodiment, if the user wants to play all the film sequentially, the user can select play all button 810. The play all button 810 is shown corresponds to smart start button 502 in FIG. 8 as an example. However, the play all button can also be corresponded to any of the main menu 500.

Figure 9A:
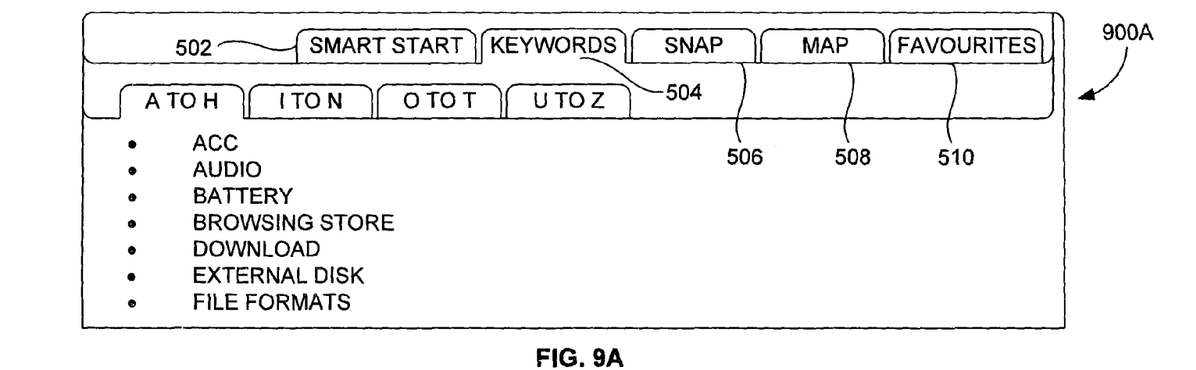
FIG. 9A illustrates a user interface view of a keyword interface pertaining to alphabets A-H for enhanced interaction with multimedia content on a storage media according to an embodiment herein.

FIG. 9A illustrates a user interface view 900A of a keyword interface pertaining to alphabets A-H for enhanced interaction with multimedia content on a storage media according to an embodiment herein. It includes the smartstart button 502, the keywords button 504, the snap button 506, the map button 508 and the favourites button 510. A user may search a multimedia content based on keyword through the keyword interface 900A. In an embodiment, once the user presses the keyword button 504, it takes the user to the root "keywords" menu. This section consists of alphabetical letters in a sequential order, as in a short encyclopaedia format, under heads such as A-H, I-N, O-T and U-Z. A number of multimedia content is categorised under A-H alphabets enabling a user to search for a desired multimedia content on a storage device through first alphabet of a title of a multimedia content. In an embodiment, a user may search for multimedia content AAC under A-H alphabetical categorisation.

Figure 9B:
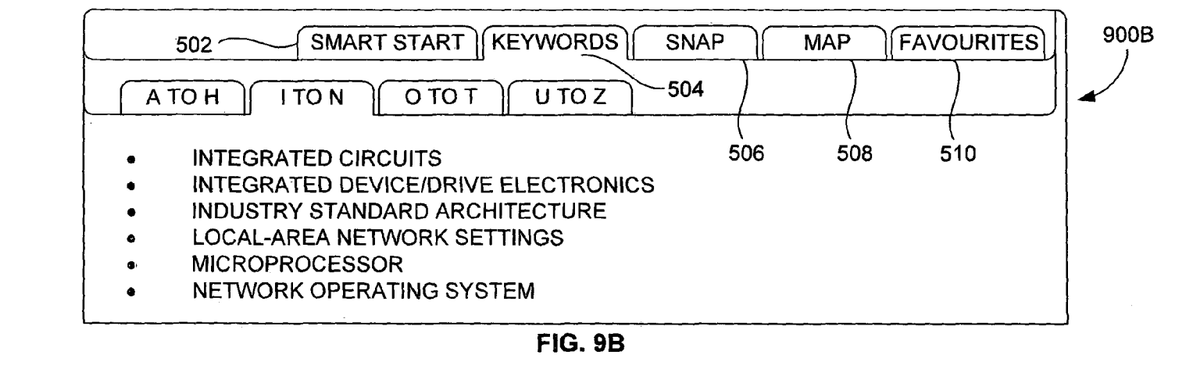
FIG. 9B illustrates a user interface view of a keyword interface pertaining to alphabets I-N for enhanced interaction with multimedia content on a storage media according to an embodiment herein.

FIG. 9B illustrates a user interface view 900B of a keyword interface pertaining to alphabets I-N for enhanced interaction with multimedia content on a storage media according to an embodiment herein. It includes the smartstart button 502, the keywords button 504, the snap button 506, the map button 508 and the favourites button 510. A user may search a multimedia content based on keyword through the keyword interface 900A. In an embodiment, a number of multimedia content is categorised under I-N alphabets enabling a user to search for a desired multimedia content on a storage device through first alphabet of a title of a multimedia content. In an embodiment, a user may search for multimedia content integrated circuits under I-N alphabetical categorisation.

For example, in an embodiment a user desires to search for a desired multimedia content on a storage device through alphabet "P" of a title of a multimedia content, the user may get number of many multimedia content say 'Photo upload in facebook' and 'Power maintenances'. Thus, user can retrieve and play desired media content using keyword interface pertaining to alphabets.

Figure 10:
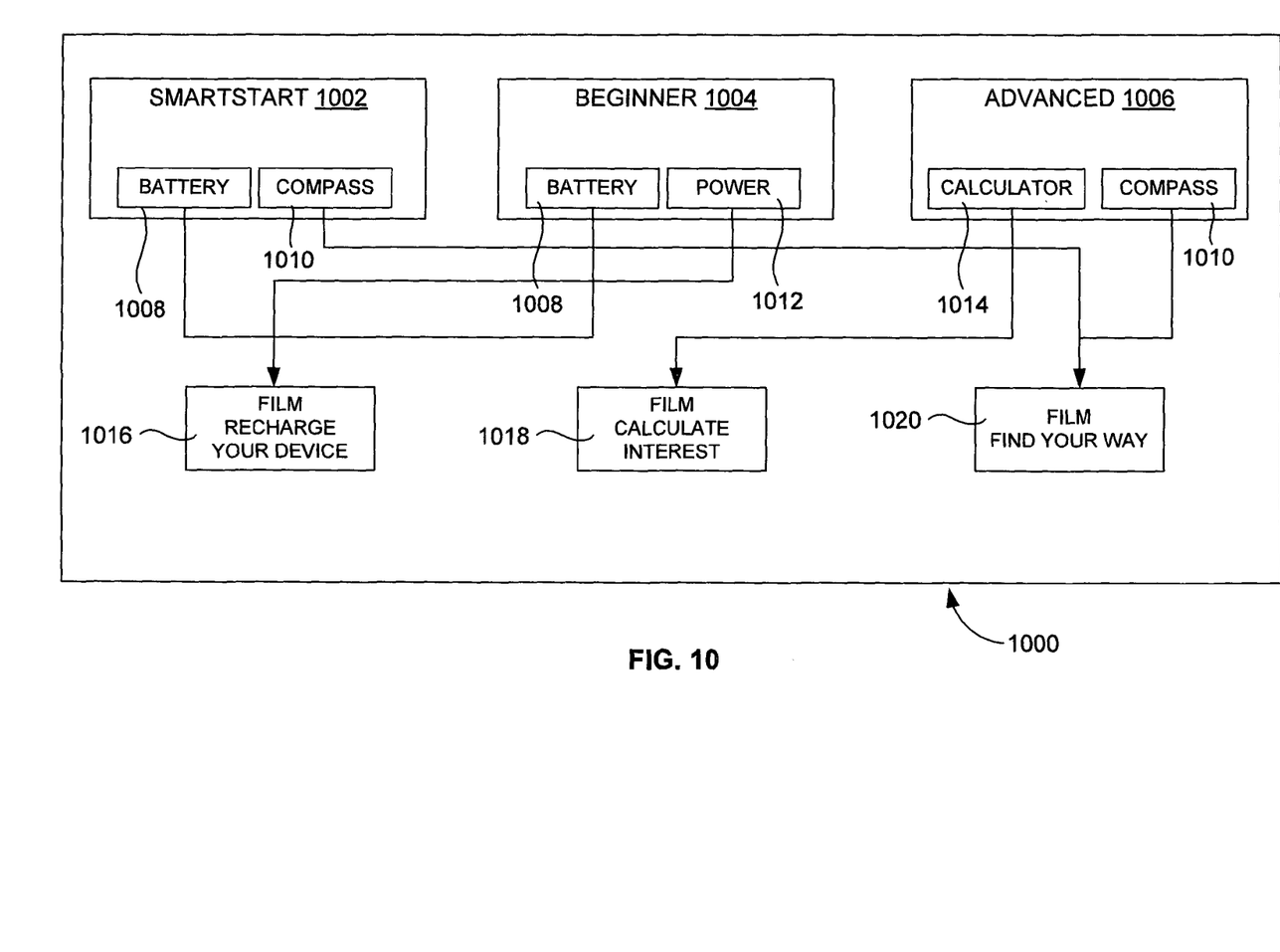
FIG. 10 illustrates a user interface view of menu with list of keywords for performing keyword search according to an embodiment herein.

FIG. 10 illustrating a user interface view 1000 of menu with list of keywords for performing keyword search according to an embodiment herein. It includes a smartstart menu 1002, a beginner menu 1004, an advanced menu 1006, a keyword battery 1008, a keyword compass 1010, a keyword power 1012 and a keyword calculator 1014. The keyword battery 1008 and the keyword compass 1010 corresponds to the smartstart menu 1002, the keyword battery 1008 and the keyword power 1012 corresponds to the beginner menu 1004, the keyword calculator 1014 and the keyword compass 1010 corresponds to the advanced menu 1006. The smartstart menu 1002, the beginner menu 1004 and the advanced menu 1006 correspond to the plurality of multimedia content includes a film recharge your device 1016, a film calculate interest 1018 and a film find your way 1020.

In an embodiment, if a user wants to know how to recharge the product, the user may click either the keywords battery 1008 or the keyword power 1012. Both the keywords play the multimedia content film recharge your device 1016. Thus, more than one keyword can be linked to one multimedia content.

In another embodiment, if a user wants to know how to calculate interest, the user may click the keyword calculator 1014 and it plays the multimedia content film calculate interest 1018. Thus, one keyword calculator 1014 can be linked to one multimedia content film calculate interest 1018. Similarly, the keyword compass 1010 can be linked to the multimedia content film find your way 1020.

In yet another embodiment, one keyword can be linked to more than one multimedia content. For example, keyword battery 1008 can be linked to multimedia content film recharge your device 1016 and also film battery life (not shown in the figure). In further embodiment, more than one keyword can also be linked to more than one multimedia content.

Figure 11A:
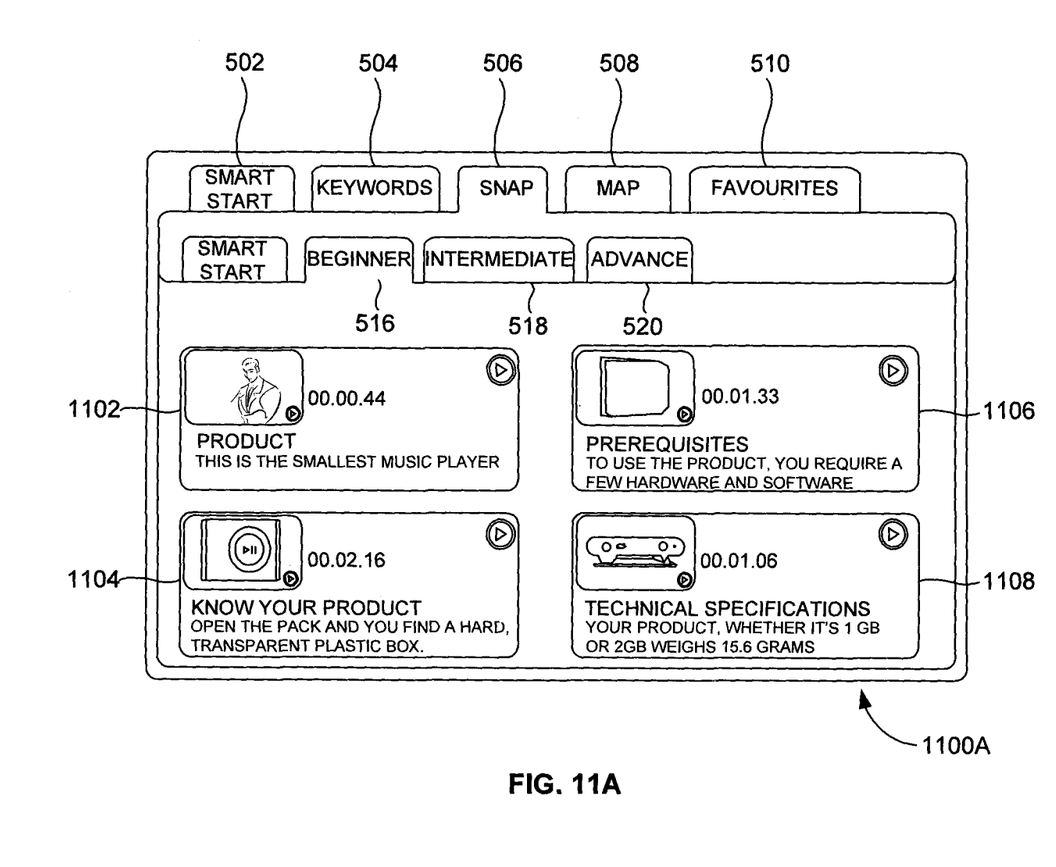
FIG. 11A illustrates a user interface view of beginner button interface of snap interface for enhanced interaction with multimedia content on a storage media according to an embodiment herein.

FIG. 11A illustrates a user interface view 1100A of beginner button interface of snap interface for enhanced interaction with multimedia content on a storage media according to an embodiment herein. The user interface view 1100A includes the smartstart button 502, the keywords button 504, the snap button 506, the map button 508, the favourites button 510, the beginner button 516, the intermediate button 518, the advanced button 520 and thumbnail previews of demo films 1102-1108. The smartstart button 502 may also be accessed through the snap interface. The user interface view 1100A provides all the videos for training a beginner level user on a product.

Figure 11B:
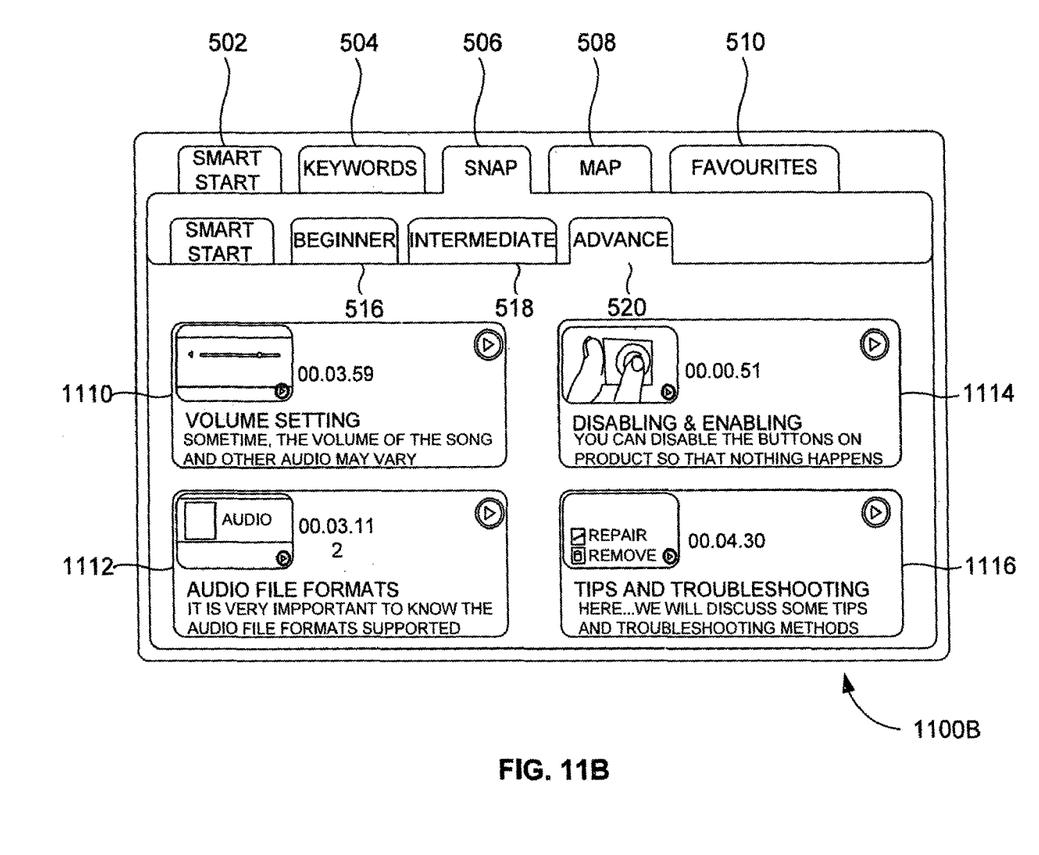
FIG. 11B illustrates a user interface view of advance button interface of snap interface for enhanced interaction with multimedia content on a storage media according to an embodiment herein.

FIG. 11B illustrates a user interface view 1100B of advance button interface of snap interface for enhanced interaction with multimedia content on a storage media according to an embodiment herein. The user interface view 1100B includes the smartstart button 502, the keywords button 504, the snap button 506, the map button 508, the favourites button 510, the beginner button 516, the intermediate button 518, the advanced button 520 and thumbnail previews of demo films 1110-1116. The user interface view 1100B provides all the videos for further training of an advance user on a product.

In one embodiment, the user selects the advance button 520. This button takes the user to another menu page, which would be the first page of the advanced menu. This scenario could have several films which the user wishes to play. The first page of the advanced menu say can display eight films. If a user is interested in sixth film which is on the first page, the user can play the sixth film by selecting the play button and post command title of that film is set to "Return to Menu". So when the film ends, the user is brought back onto the advanced menu.

In another embodiment, if the user is interested in tenth film which is on the second page of the advanced menu, the user can navigate to the second page using a "Next" button provided at the bottom of the page of the first page or directly to the second page from the advanced menu using "page two". Further, the user can navigate from second page to the first page using "previous" button or directly to the advanced menu. The embodiments herein described are not limited only to advanced menu of the snap interface. However, it can also applicable to the other categories such as beginner button 516, intermediate button 518 and smart start 502.

Figure 12:
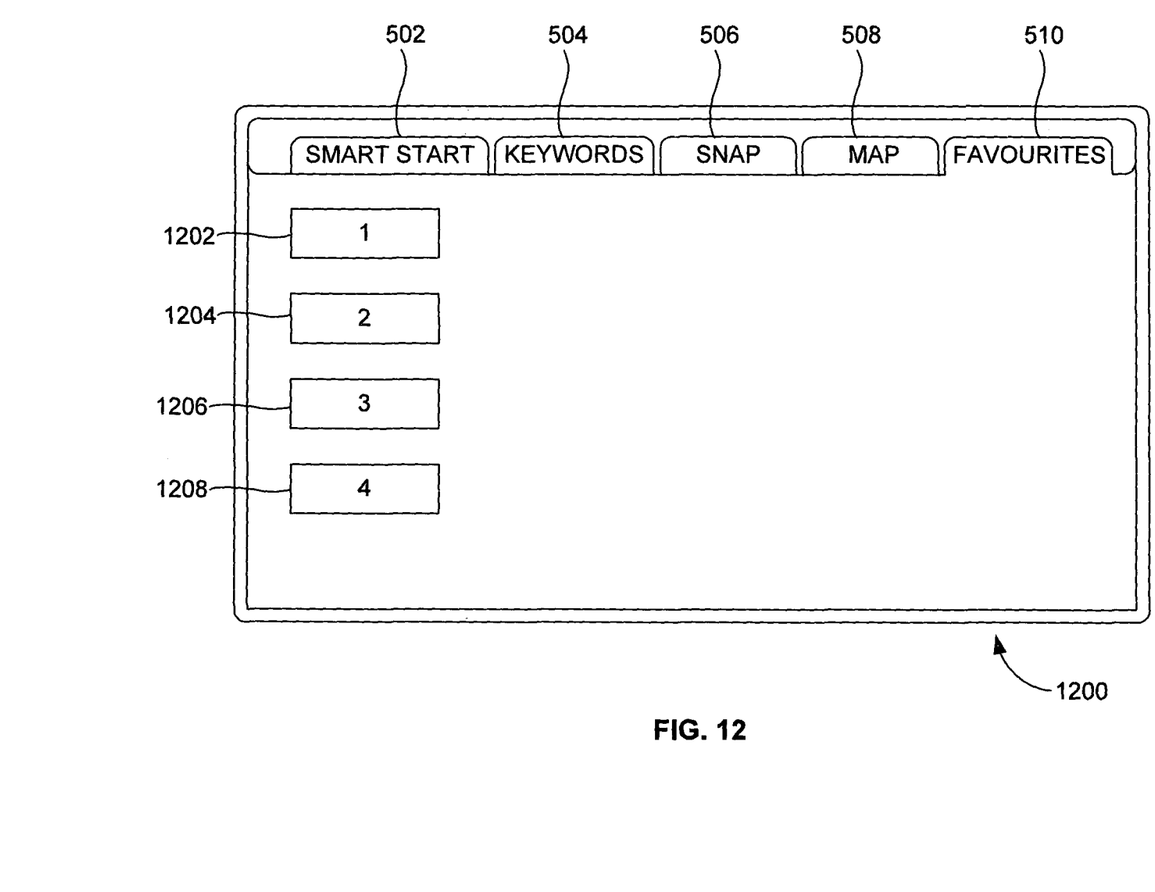
FIG. 12 illustrates a user interface view of a favourites interface for enhanced interaction with multimedia content on a storage media according to an embodiment herein.

FIG. 12 illustrates a user interface view 1200 of a favourites button interface for enhanced interaction with multimedia content on a storage media according to an embodiment herein. The user interface view 1200 includes the smartstart button 502, the keywords button 504, the snap button 506, the map button 508, the favourites button 510 and a sequential order of multimedia contents 1202-1208. In an embodiment, the thumbnail preview of the demo multimedia content 1202-1208 is listed in the sequence of 1, 2, 3 and 4 respectively. If a user desires to play the multimedia content 1406, the user may click on 3 and the multimedia content will be displayed.

Figure 13:
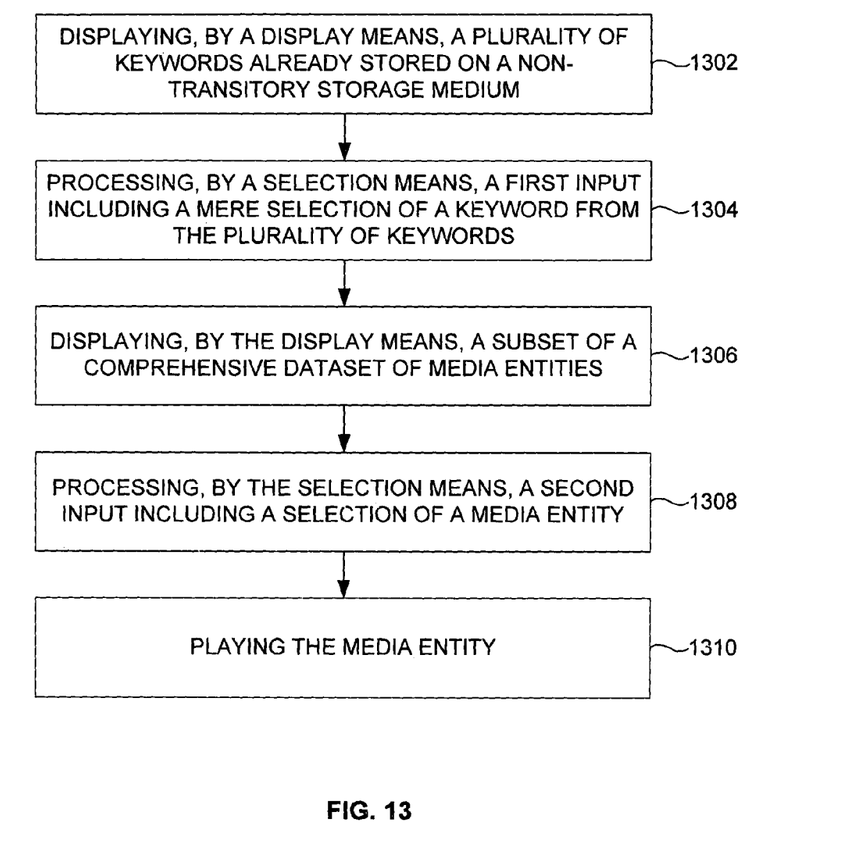
FIG. 13 is a flow diagram illustrating a method of enhanced search and retrieval of one or more relevant media entities from a comprehensive dataset of media entities stored on a non-transitory storage medium that is readable by a non-versatile interpretation device and executed on a player device according to an embodiment herein.

FIG. 13 is a flow diagram illustrating a method of enhanced search and retrieval of one or more relevant media entities from a comprehensive dataset of media entities stored on a non-transitory storage medium that is readable by a non-versatile interpretation device and executed on a player device according to an embodiment herein. The non-transitory storage medium includes instructions that are executable even on the non-versatile interpretation device to enable the above method. The non-versatile interpretation device includes a navigation engine that is built on a limited set of virtual commands embedded on to a chipset to provide interaction with the media entities. The non-transitory storage medium stores a plurality of keywords that are in-built. Each of the keywords are pre-linked to one or more media entities on the non-transitory storage medium. The player device includes a processor, a selection means, and a display.

In step 1302, the plurality of keywords are displayed by the display means that are already on the non-transitory medium. In step 1304, a first input that includes a mere selection of a keyword from the plurality of keywords is processed by the selection means. In step 1306, a subset of the comprehensive dataset of media entities is displayed by the display means. The subset consists of specific media entities that are pre-linked to the keyword on the non-transitory storage medium. In step 1308, a second input that includes a selection of a media entity is processed by the selection means. In step 1310, the media entity is played.

The plurality of keywords already stored on the non-transitory storage medium is displayed in response to a selection of a keywords interactive entity from a first level menu that includes the keywords menu interactive entity, a graded submenu interactive entity, a favourites menu interactive entity, and/or a key media entities menu interactive entity. A first level submenu interactive entity and a second level submenu interactive entity are displayed in response to a selection of the graded submenu interactive entity. A first subset of said comprehensive dataset of media entities is linked to the first level submenu, and a second subset of said comprehensive dataset of media entities is linked to a second level submenu.

The method of enhanced search and retrieval of one or more relevant media entities from said comprehensive dataset of media entities stored on said non-transitory storage medium further includes processing, by the selection means, a third input that includes a selection of the first level submenu, and displaying the first subset of the comprehensive dataset of media entities linked to the first level submenu in response to the selection of said first level submenu. The keywords interactive entity is also displayed on the same screen along with the first level submenu and the second level submenu.

The method of enhanced search and retrieval of one or more relevant media entities from said comprehensive dataset of media entities stored on said non-transitory storage medium further includes processing, by the selection means, a fourth input comprising a selection of the second level submenu, and displaying the second subset of said comprehensive dataset of media entities linked to the second level submenu in response to the selection of the second level submenu. The keywords interactive entity is may also be again displayed on the same screen along with the first level submenu and the second level submenu.

The media entities are displayed along with a unique identification reference. The method of enhanced search and retrieval of one or more relevant media entities from said comprehensive dataset of media entities stored on said non-transitory storage medium further includes recording a unique identification reference of a relevant media entity, processing, by the selection means, a fifth input that includes a selection of the favourites interactive entity, displaying, by the display means, a set of interactive entities along with their corresponding unique identification references, and playing, the relevant media entity in response to a selection of an interactive entity corresponding to the unique identification reference by a user. The set of interactive entities correspond to the comprehensive dataset of media entities.

The method of enhanced search and retrieval of one or more relevant media entities from said comprehensive dataset of media entities stored on said non-transitory storage medium further includes processing, by the selection means, a fifth input that includes a selection of at least one selected menu from the keywords menu interactive entity, the graded submenu interactive entity, a favourites menu interactive entity, or a key media entities menu interactive entity, playing a set of media entities that correspond to the selected menu in response to a selection of a play all interactive entity, and automatically displaying, by the display means, the selected menu once the set of media entities corresponding to the selected menu is played.

The embodiments provide an advantage of storage media such as DVD provides more interaction with the multimedia content. The multimedia contents are put in the DVD only once for each entity. Yet they can be reached by various different levels of roots—from say snap-beginner, or favourites, or smartstart or through keyword search. In each case they ultimately choose the same film. Because all the buttons that are ultimately linked to the same multimedia contents, are pointing to this same entity. Further, the user can navigate from any first level of roots such as the smartstart button 502, the keywords button 504, the snap button 506, the map button 506 and the favourites button 510 page to any second level of roots such as the beginner button 516, the intermediate button 518, the advanced button 520 and the alphabet page 514 and also from any second level of roots to the any first level of roots. This also provides more user interface with storage media such as DVD to access and play the multimedia content.

In one embodiment a map interface for enhanced interaction with multimedia content on a storage media may also be provided. The map button interface provides topology of the multimedia content of an entire product like functional, to discover all functions of a product layer by layer. In one embodiment, the map interface may provide a tree structure of the product with a number of features of the product forming a number of branches of the tree. The user may view any of the features directly from the map button interface. Moreover the user can search the map interface and it will allow the user to check all relevant features one at a time in a predefined hierarchy.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A non-transitory storage medium readable by a non-versatile interpretation device and executable on a player device, said non-transitory storage medium comprising instructions executable even on said non-versatile interpretation device to enable a method of enhanced search and retrieval of one or more relevant media entities from a comprehensive dataset of media entities stored on said non-transitory storage medium, said method comprising:

processing a selection of a first level menu comprising a keywords interactive entity and a graded submenu interactive entity;

displaying, by a display, a plurality of keywords which are in-built on said non-transitory storage medium based on a selection of said keywords interactive entity, wherein said non-transitory storage medium stores said plurality of keywords that are in-built, wherein each of said plurality of keywords is pre-linked to at least one of said media entities on said non-transitory storage medium, wherein said non-versatile interpretation device comprises a navigation engine built on a limited set of virtual commands embedded on to a chipset to provide interaction with said media entities, wherein said player device comprising a processor, a selection means, and said display;

processing, by said selection means, a first input comprising a mere selection of a keyword from said plurality of keywords that are in-built;

displaying, by said display means, a subset of said comprehensive dataset of media entities, wherein said subset consists of specific media entities pre-linked to said keyword on said non-transitory storage medium;

processing, by said selection means, a second input comprising a selection of a media entity from said subset of said comprehensive dataset of media entities; and playing said media entity, wherein a first level submenu interactive entity and a second level submenu interactive entity are displayed in response to a selection of said graded submenu interactive entity.

2. The non-transitory storage medium of claim 1, wherein said plurality of keywords already stored on said non-transitory storage medium is displayed in response to said selection of said keywords interactive entity from said first level menu comprising said keywords interactive entity, said graded submenu interactive entity, a favourites interactive entity, and a key media entities interactive entity.

3. The non-transitory storage medium of claim 1, wherein said method of enhanced search and retrieval of one or more relevant media entities from said comprehensive dataset of media entities stored on said non-transitory storage medium further comprises:

processing a selection of said favourites interactive entity;

displaying said comprehensive dataset of media entities in response to said selection of said favourites interactive entity, wherein each media entity in said comprehensive dataset of media entities is displayed along with a unique identification reference.

4. The non-transitory storage medium of claim 3, wherein said method of enhanced search and retrieval of one or more relevant media entities from said comprehensive dataset of media entities stored on said non-transitory storage medium further comprises:

recording, by a user, a unique identification reference of a relevant media entity; and playing, said relevant media entity in response to a selection of said unique identification reference by said user.

5. The non-transitory storage medium of claim 4, wherein said method of enhanced search and retrieval of one or more relevant media entities from said comprehensive dataset of media entities stored on said non-transitory storage medium further comprises:

processing, by said selection means, a fifth input comprising a selection of at least one selected menu from said keywords menu interactive entity, said graded submenu interactive entity, a favourites menu interactive entity, or a key media entities menu interactive entity;

playing a set of media entities that correspond to said selected menu in response to a selection of a play all interactive entity; and automatically displaying, by said display means, said selected menu once said set of media entities corresponding to said selected menu is played.

6. The non-transitory storage medium of claim 1, wherein a first subset of said comprehensive dataset of media entities is linked to said first level submenu, and a second subset of said comprehensive dataset of media entities is linked to a second level submenu, wherein said method of enhanced search and retrieval of one or more relevant media entities from said comprehensive dataset of media entities stored on said non-transitory storage medium further comprises:

processing, by said selection means, a third input comprising a selection of said first level submenu; and displaying said first subset of said comprehensive dataset of media entities linked to said first level submenu in response to said selection of said first level submenu, wherein said keywords interactive entity is also displayed on the same screen along with said first level submenu and said second level submenu.

7. The non-transitory storage medium of claim 6, wherein said method of enhanced search and retrieval of one or more relevant media entities from said comprehensive dataset of media entities stored on said non-transitory storage medium further comprises:

processing a selection of a media entity from said first subset and said second subset; and playing said media entity.

8. The non-transitory storage medium of claim 1, wherein said method of enhanced search and retrieval of one or more relevant media entities from said comprehensive dataset of media entities stored on said non-transitory storage medium further comprises:

processing, by said selection means, a fourth input comprising a selection of said second level submenu; and displaying said second subset of said comprehensive dataset of media entities linked to said second level submenu in response to said selection of said second level submenu, wherein said keywords interactive entity is also displayed on the same screen along with said first level submenu and said second level submenu.

\* \* \* \* \*